(12) United States Patent
Ng et al.

(10) Patent No.: US 12,170,663 B2
(45) Date of Patent: Dec. 17, 2024

(54) SYSTEMS AND METHODS FOR PROVIDING SECURE ACCESS TO A PRIVATE MULTIACCESS EDGE COMPUTING DEVICE VIA A MULTI-TENANCY ENVIRONMENT

(71) Applicant: Verizon Patent and Licensing Inc., Basking Ridge, NJ (US)

(72) Inventors: Mason Ng, Hillsborough, CA (US); Patricia R. Chang, San Ramon, CA (US); Syed Arshad Aziz, Plano, TX (US); Shi-Jau Wang, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 297 days.

(21) Appl. No.: 17/648,072

(22) Filed: Jan. 14, 2022

(65) Prior Publication Data
US 2023/0231847 A1    Jul. 20, 2023

(51) Int. Cl.
*H04L 29/06* (2006.01)
*H04L 9/40* (2022.01)
*H04W 12/08* (2021.01)

(52) U.S. Cl.
CPC ........ *H04L 63/0876* (2013.01); *H04L 63/102* (2013.01); *H04L 63/105* (2013.01); *H04L 63/20* (2013.01); *H04W 12/08* (2013.01)

(58) Field of Classification Search
CPC ..... H04L 63/00; H04L 63/0876; H04L 63/10; H04L 63/102; H04L 63/105; H04L 63/20; H04L 63/08
See application file for complete search history.

(56) References Cited

U.S. PATENT DOCUMENTS

| 8,387,046 B1 * | 2/2013 | Montague | G06F 9/45558 |
| | | | 718/1 |
| 11,063,930 B1 * | 7/2021 | Bose | H04L 63/0428 |

(Continued)

FOREIGN PATENT DOCUMENTS

| CN | 112231659 A | * | 1/2021 | |
| WO | WO-2022125456 A1 | * | 6/2022 | |
| WO | WO-2023272419 A1 | * | 1/2023 | ......... G06F 9/45558 |

OTHER PUBLICATIONS

B. Ali, M. A. Gregory and S. Li, "Multi-Access Edge Computing Architecture, Data Security and Privacy: A Review," in IEEE Access, vol. 9, pp. 18706-18721, 2021, doi: 10.1109/ACCESS.2021. 3053233. (Year: 2021).*

*Primary Examiner* — Benjamin E Lanier
*Assistant Examiner* — Alexandria C Rodriguez

(57) ABSTRACT

A device may receive and store credentials identifying security levels of users for access to functionalities of an on-premises device, and may receive a credential of a user and a request to access a functionality of the on-premises device. The device may determine whether a security level of the credential matches a first security level of the credentials, and may reject the request when the security level fails to match the first security level. The device may determine, when the security level matches the first security level, whether a computing resource of the on-premises device matches a computing resource of the first security level, and may provide the user with access to the computing resource when the computing resource matches the computing resource of the first security level. The device may reject the request when the computing resource fails to match the computing resource of the first security level.

20 Claims, 14 Drawing Sheets

(56) References Cited

U.S. PATENT DOCUMENTS

| | | | |
|---|---|---|---|
| 11,218,553 B2* | 1/2022 | Filippou | H04L 67/12 |
| 2017/0346644 A1* | 11/2017 | Cambou | H04L 63/08 |
| 2018/0210751 A1* | 7/2018 | Pepus | G06F 21/62 |
| 2020/0228350 A1* | 7/2020 | Rydkin | G06F 21/30 |
| 2022/0086864 A1* | 3/2022 | Sabella | H04L 41/0895 |
| 2022/0131869 A1* | 4/2022 | Soma | H04L 63/20 |
| 2022/0368528 A1* | 11/2022 | Vennapusa | H04L 9/3073 |
| 2023/0016364 A1* | 1/2023 | Agarwal | H04L 63/0236 |
| 2023/0090200 A1* | 3/2023 | Rakshit | H04L 63/105 |
| | | | 726/4 |
| 2023/0179998 A1* | 6/2023 | McCracken, Jr. | H04W 12/06 |
| | | | 726/6 |

* cited by examiner

| User | Security Level 1 | Security Level 2 | Security Level 3 | Security Level 4 |
|---|---|---|---|---|
| User 1 | Resources 1 and 3 | None | None | None |
| User 2 | All resources | Hypervisor | All VM instances | All Apps |
| User 3 | Resources 4 and 5 | None | None | None |
| User 4 | Resource 2 | Hypervisor | VM instance 3 | None |
| User 5 | All resources | None | None | None |
| User 6 | Resources 1 and 2 | Hypervisor | VM instances 1, 2 | App 6, App 7 |
| *** | *** | *** | *** | *** |

FIG. 1B

SYSTEMS AND METHODS FOR PROVIDING SECURE ACCESS TO A PRIVATE MULTIACCESS EDGE COMPUTING DEVICE VIA A MULTI-TENANCY ENVIRONMENT

BACKGROUND

Private multi-access edge computing (pMEC) may include an edge computing infrastructure and a radio access network (RAN) installed on-premises. The integration of the pMEC with a private RAN provides enterprises with a secure and dedicated computing platform that delivers ultralow latency and other MEC benefits to specific areas within the enterprises.

BRIEF DESCRIPTION OF THE DRAWINGS

FIGS. 1A-1K are diagrams of an example associated with providing secure access to a pMEC device via a multi-tenancy environment.

DETAILED DESCRIPTION OF EXAMPLE EMBODIMENTS

Figure 1A:
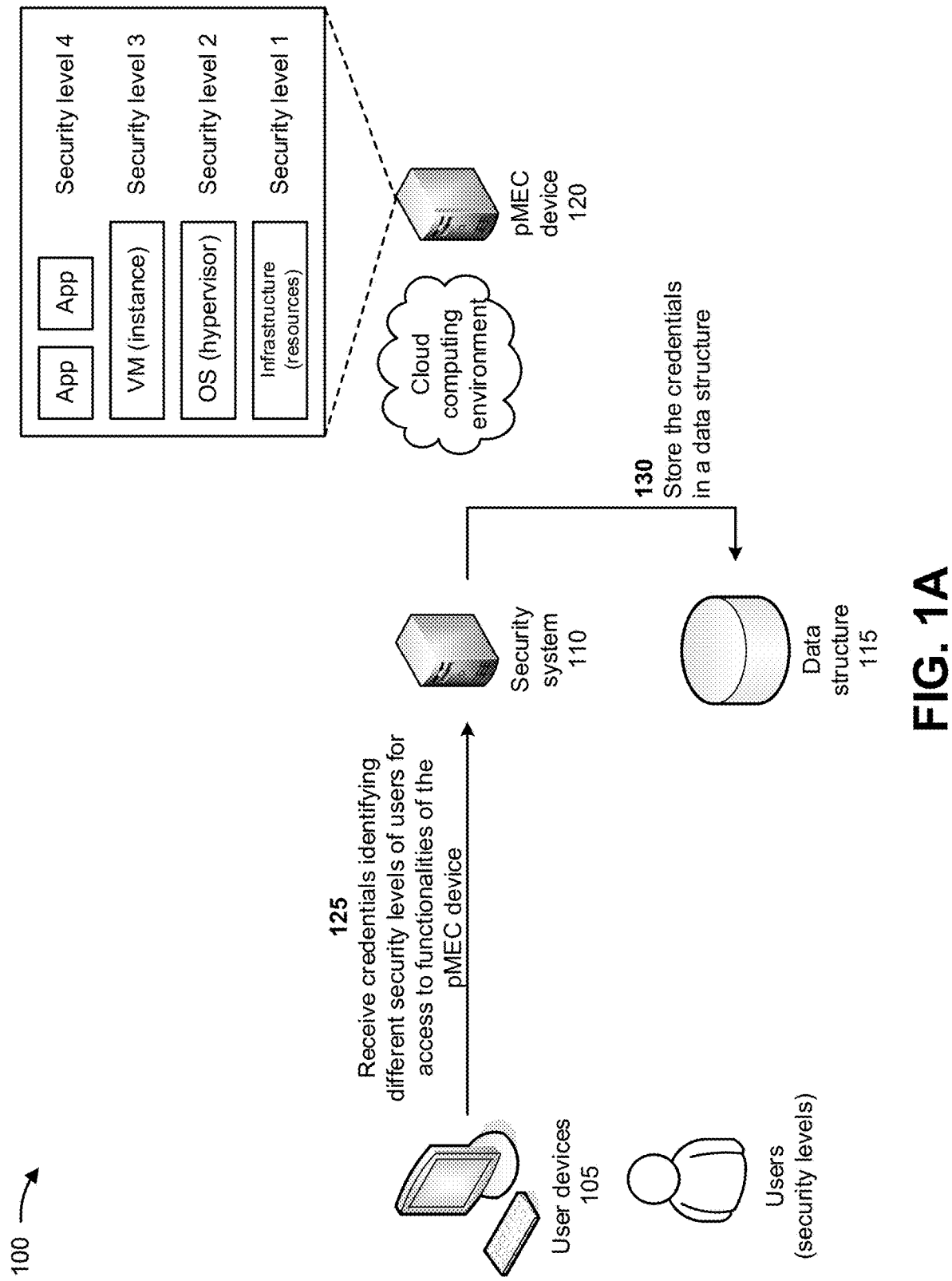

The following detailed description of example implementations refers to the accompanying drawings. The same reference numbers in different drawings may identify the same or similar elements.

A user (e.g., a network technician, an independent service vendor, a customer, and/or the like) may need to access one or more functionalities (e.g., infrastructure, operating systems, virtual machine instances, and/or the one or more applications) of a pMEC device. Different users may require different credentials for accessing different functionalities of the pMEC device via a multi-tenancy environment, such as a cloud computing environment. For example, a user accessing an application of the pMEC device may require separate credentials for accessing the application and for accessing each of the infrastructure, the operating system, and the virtual machine associated with the application. In another example, a user accessing a computing resource of the pMEC device may require a single credential for accessing the computing resource. However, providing multiple credentials for accessing different functionalities of the pMEC device is cumbersome, time consuming, and requires remembering and correctly inputting the credentials. Furthermore, managing a large quantity of credentials (e.g., key files) is difficult, which increases a possibility of a security breach of the pMEC device. Thus, current techniques for accessing functionalities of a pMEC device consume computing resources (e.g., processing resources, memory resources, communication resources, and/or the like), networking resources, and/or other resources associated with enabling security breaches of the pMEC device, discovering the security breaches of the pMEC device, managing a large quantity of credentials, receiving incorrect credentials, and/or the like.

Some implementations described herein provide a device (e.g., a security system) that provides secure access to a pMEC device via a multi-tenancy environment. For example, the security system may receive credentials identifying security levels of users for access to functionalities of an on-premises device, and may store the credentials in a data structure. The security system may receive a credential of a user and a request of the user to access a functionality of the on-premises device, and may determine whether a security level of the credential matches a first security level of one of the credentials stored in the data structure. The security system may reject the request based on the security level of the credential failing to match the first security level of the one of the credentials, or may determine, based on the security level of the credential matching the first security level, whether a computing resource of the on-premises device, requested by the request, matches a computing resource of the first security level of the one of the credentials. The security system may provide the user with access to the computing resource based on the computing resource of the on-premises device matching the computing resource of the first security level of the one of the credentials, and may reject the request based on the computing resource of the on-premises device failing to match the computing resource of the first security level of the one of the credentials.

In this way, the security system provides secure access to a pMEC device via a multi-tenancy environment. For example, the security system may enable a user (e.g., a network technician, an independent service vendor, a customer, and/or the like) to securely access different functionalities of the pMEC device with a single credential. The security system may provide access to an infrastructure (e.g., computing resources) level of the pMEC device, an operating system (e.g., hypervisor) level of the pMEC device, a virtual machine (VM) instances level of the pMEC device, and/or an application level of the pMEC device. Thus, the security system may conserve computing resources, networking resources, and/or other resources that would have otherwise been consumed by enabling security breaches of the pMEC device, discovering the security breaches of the pMEC device, managing a large quantity of credentials, receiving incorrect credentials, and/or the like.

FIGS. 1A-1K are diagrams of an example 100 associated with providing secure access to a pMEC device via a multi-tenancy environment. As shown in FIGS. 1A-1K, example 100 includes user devices 105 (e.g., associated with users), a security system 110, a data structure 115, and a pMEC device 120. Further details of the user devices 105, the security system 110, the data structure 115, and the pMEC device 120 are provided elsewhere herein. In some implementations, the security system 110 may be hosted in a cloud computing environment, and the user devices 105 may communicate with the pMEC device 120 via the security system 110 and/or the cloud computing environment.

As shown in FIG. 1A, and by reference number 125, the security system 110 may receive credentials identifying security levels of users for access to functionalities of the pMEC device 120. For example, the users of the user devices 105 may be associated with different security levels for accessing different security levels of the pMEC device 120. The different security levels may include a first security level that provides access to an infrastructure (e.g., one or more computing resources) level of the pMEC device 120, a second security level that provides access to an operating system (e.g., hypervisor) level of the pMEC device 120, a third security level that provides access to a VM instances level of the pMEC device 120, a fourth security level that provides access to an application level of the pMEC device 120, and/or the like. The users may utilize the credentials, such as one or more different passwords, tokens, keys, biometrics, and/or other security mechanisms, to access the different security levels of the pMEC device 120. The credentials may further identify the security levels of the users, security mechanisms to utilize for the security levels, and/or the like.

In some implementations, one or more of the user devices 105 may provide the credentials to the security system 110, and the security system 110 may receive the credentials. The one or more of the user devices 105 may periodically provide the credentials to the security system 110, may continuously provide the credentials to the security system 110, may provide the credentials to the security system 110 during a single batch upload, may provide the credentials to the security system 110 based on a request from the security system 110, and/or the like. In some implementations, the security system 110 may generate a single credential for each of the users and may provide the single credentials to the user devices 105 (e.g., for review by the users).

As further shown in FIG. 1A, and by reference number 130, the security system 110 may store the credentials in the data structure 115. For example, the data structure 115 may include a database, a table, a list, and/or the like that is secure and only accessible by the security system 110. In some implementations, the security system 110 may store the credentials in a format (e.g., a table) in the data structure 115 so that the security system 110 may quickly and easily retrieve the credentials for comparison to access requests of the pMEC device 120. Further details of the data structure 115 are described below in connection with FIG. 1B.

As shown in FIG. 1B, the data structure 115 may include multiple fields with multiple entries in each of the fields for the credentials stored in the data structure 115. For example, the data structure 115 may include a user field identifying the potential users of functionalities of the pMEC device 120, such as a first user (e.g., User 1), a second user (e.g., User 2), and/or the like. The data structure 115 may include a first security level field (e.g., Security Level 1) identifying infrastructure (e.g., computing resources) of the pMEC device 120 that is accessible by the users identified in the user field. For example, the first security level field may indicate that the first user may access a first computing resource and a third computing resource of the pMEC device 120, that the second user and the fifth user may access all computing resources of the pMEC device 120, that the third user may access the fourth computing resource and the fifth computing resource of the pMEC device 120, and that the sixth user may access the first computing resource and the second computing resource of the pMEC device 120.

The data structure 115 may include a second security level field (e.g., Security Level 2) identifying one or more operating systems (e.g., a hypervisor) of the pMEC device 120 that are accessible by the users identified in the user field. For example, the second security level field may indicate that the first user, the third user, and the fifth user may not access the operating systems of the pMEC device 120, and that the second user, the fourth user, and the sixth user may access the hypervisor of the pMEC device 120. Since the first user, the third user, and the fifth user may not access the operating systems of the pMEC device 120 (e.g., the second security level), the first user, the third user, and the fifth user may not access any additional security levels of the pMEC device 120 (e.g., the third security level and the fourth security level).

The data structure 115 may include a third security level field (e.g., Security Level 3) identifying VMs (e.g., VM instances) of the pMEC device 120 that are accessible by the users identified in the user field. For example, the third security level field may indicate that the first user, the third user, and the fifth user may not access the VM instances of the pMEC device 120, that the second user may access all VM instances of the pMEC device 120, that the fourth user may access a third VM instance of the pMEC device 120, and that the sixth user may access a first VM instance and a second VM instance of the pMEC device 120.

The data structure 115 may include a fourth security level field (e.g., Security Level 4) identifying applications of the pMEC device 120 that are accessible by the users identified in the user field. For example, the fourth security level field may indicate that the first user, the third user, the fourth user, and the fifth user may not access the applications of the pMEC device 120, that the second user may access all applications of the pMEC device 120, and that the sixth user may access a sixth application and a seventh application of the pMEC device 120.

In some implementations, the data structure 115 may include additional fields and/or entries, different fields and/or entries, and/or the like than those depicted in FIG. 1B. For example, the data structure 115 may include a field identifying security mechanisms to utilize for the security levels and/or the different computing resources, hypervisors, VM instances, and applications identified for the security levels; may identify additional security level fields; and/or the like.

Figure 1C:
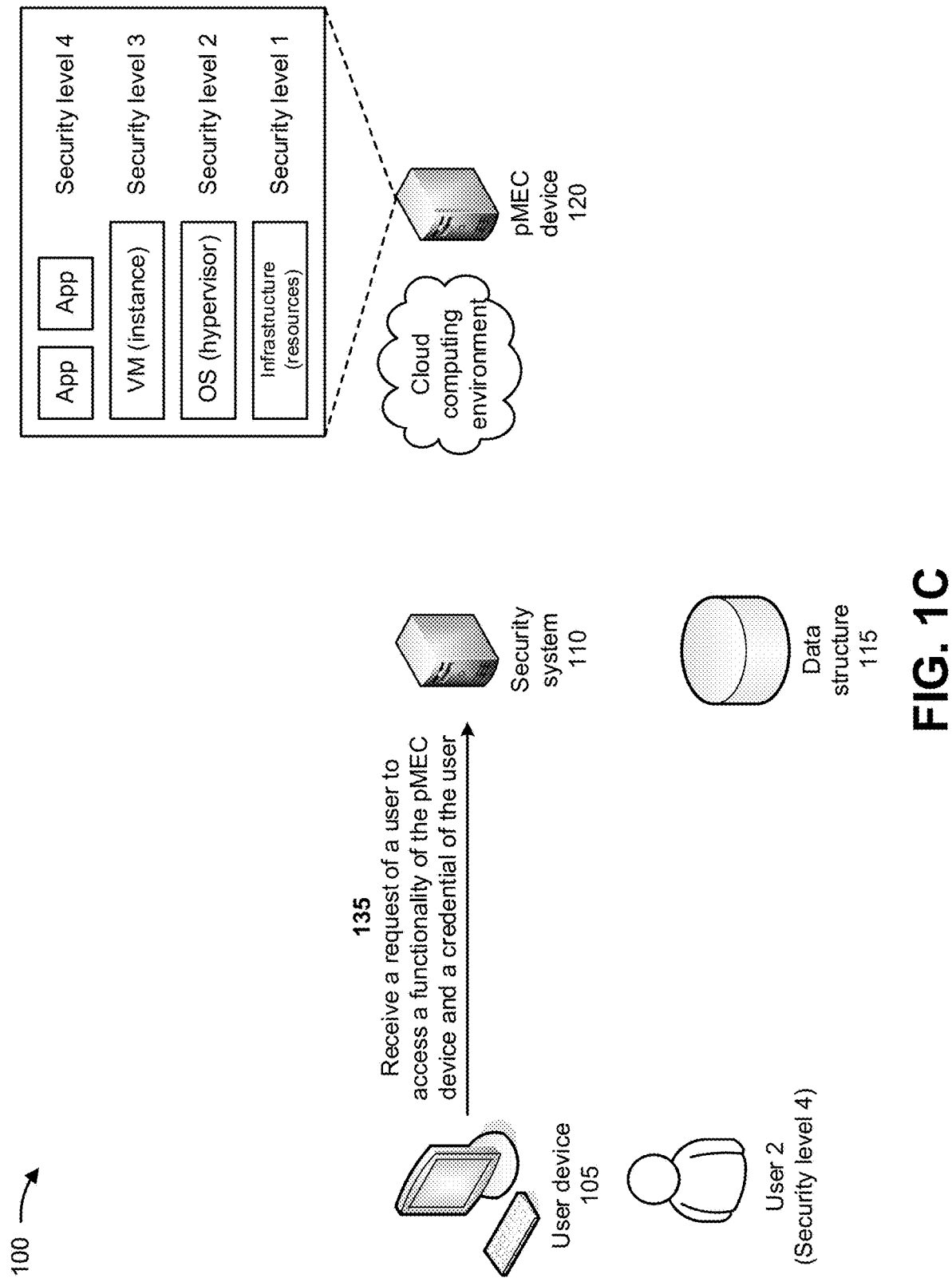

As shown in FIG. 1C, and by reference number 135, the security system 110 may receive a request of a user to access a functionality of the pMEC device 120 and a credential of the user. For example, the user may be associated with one of the user devices 105 and may wish to access functionality (e.g., an application) of the pMEC device 120. The user may be associated with the fourth security level of access to the pMEC device 120. The user may utilize the user device 105 to generate the request to access the functionality of the pMEC device 120 and to input the credential of the user (e.g., a single credential of the user generated by the security system 110 for the user). Alternatively, the user may utilize the user device 105 to input one of the credentials previously provided to the security system 110, as described in connection with FIG. 1A. The user may cause the user device 105 to provide the request and the credential to the security system 110, and the security system 110 may receive the request and the credential.

Figure 1D:
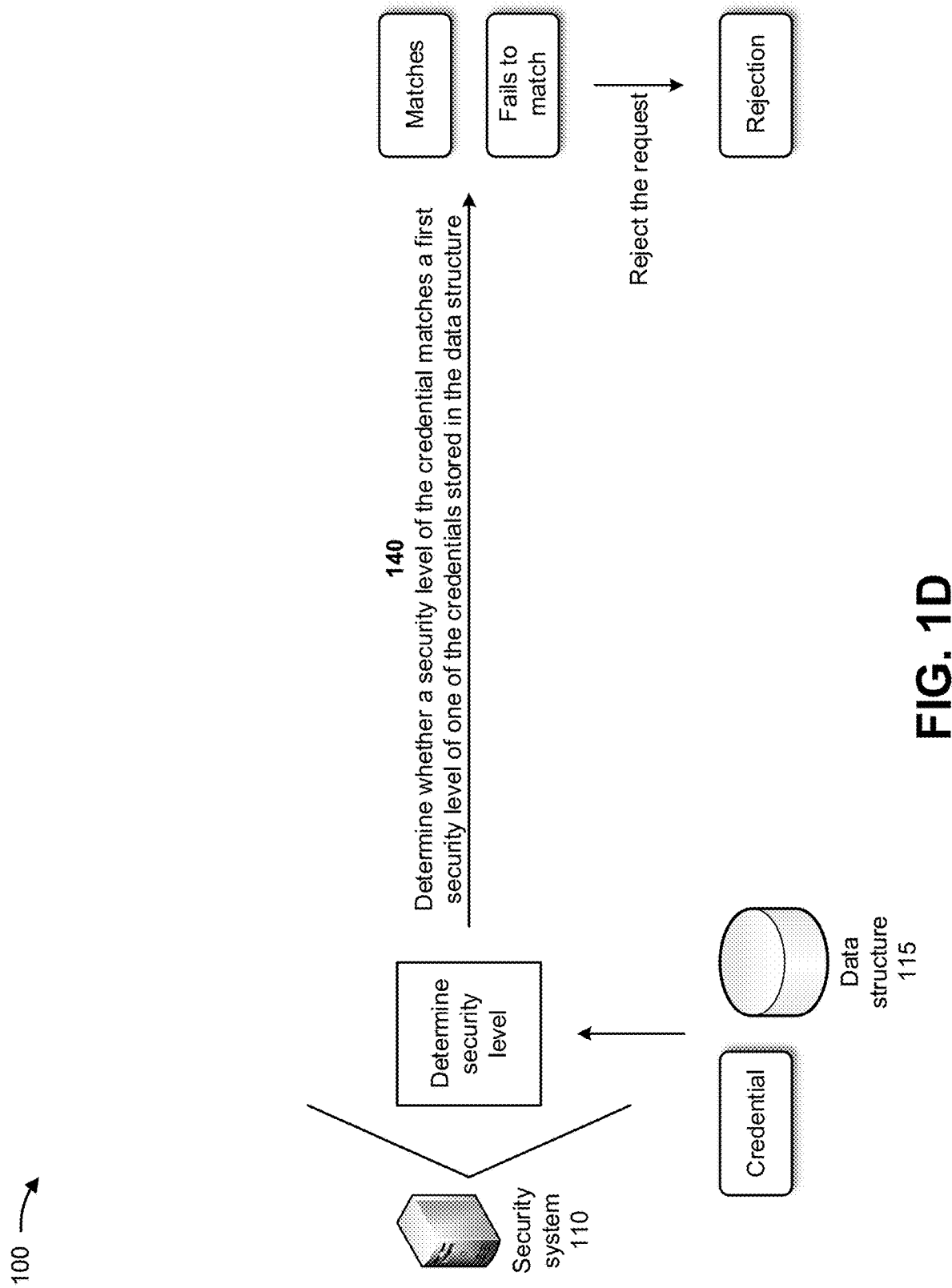

As shown in FIG. 1D, and by reference number 140, the security system 110 may determine whether a security level of the credential matches a first security level of one of the credentials stored in the data structure 115. For example, the security system 110 may identify one of the credentials stored in the data structure 115 that is associated with the user, and may identify the first security level of the identified credential stored in the data structure 115. In some implementations, if the security system 110 is unable to identify one of the credentials stored in the data structure 115 that is associated with the user, the security system 110 may reject the request. The security system 110 may compare the security level of the credential and the first security level of the identified credential stored in the data structure 115. The security system 110 may determine whether the security level of the credential matches the first security level of the identified credential stored in the data structure 115 based on comparing the security level of the credential and the first security level of the identified credential.

In some implementations, the security system 110 may determine that the security level of the credential matches the first security level of the identified credential stored in the data structure 115 when the security level of the credential indicates that the user satisfies the first security level of the identified credential (e.g., indicates that the user has access to the computing resources of the pMEC device 120). In some implementations, the security system 110 may determine that the security level of the credential fails to match the first security level of the identified credential stored in the data structure 115 when the security level of the credential indicates that the user fails to satisfy the first security level of the identified credential (e.g., indicates that the user does not have access to the computing resources of the pMEC device 120).

As further shown in FIG. 1D, the security system 110 may reject the request when the credential fails to match a first security level of the one of the credentials stored in the data structure 115. For example, the security system 110 may determine that the security level of the credential indicates that the user fails to satisfy the first security level of the identified credential. Thus, the security system 110 may determine that the security level of the credential fails to match the first security level of the identified credential stored in the data structure 115. When the security level of the credential fails to match the first security level of the identified credential, the security system 110 may reject the request of the user to access the functionality of the pMEC device 120. For example, the security system 110 may deny the user device 105 access to the functionality of the pMEC device 120, and may provide, to the user device 105, a message indicating that the request was rejected.

Figure 1E:
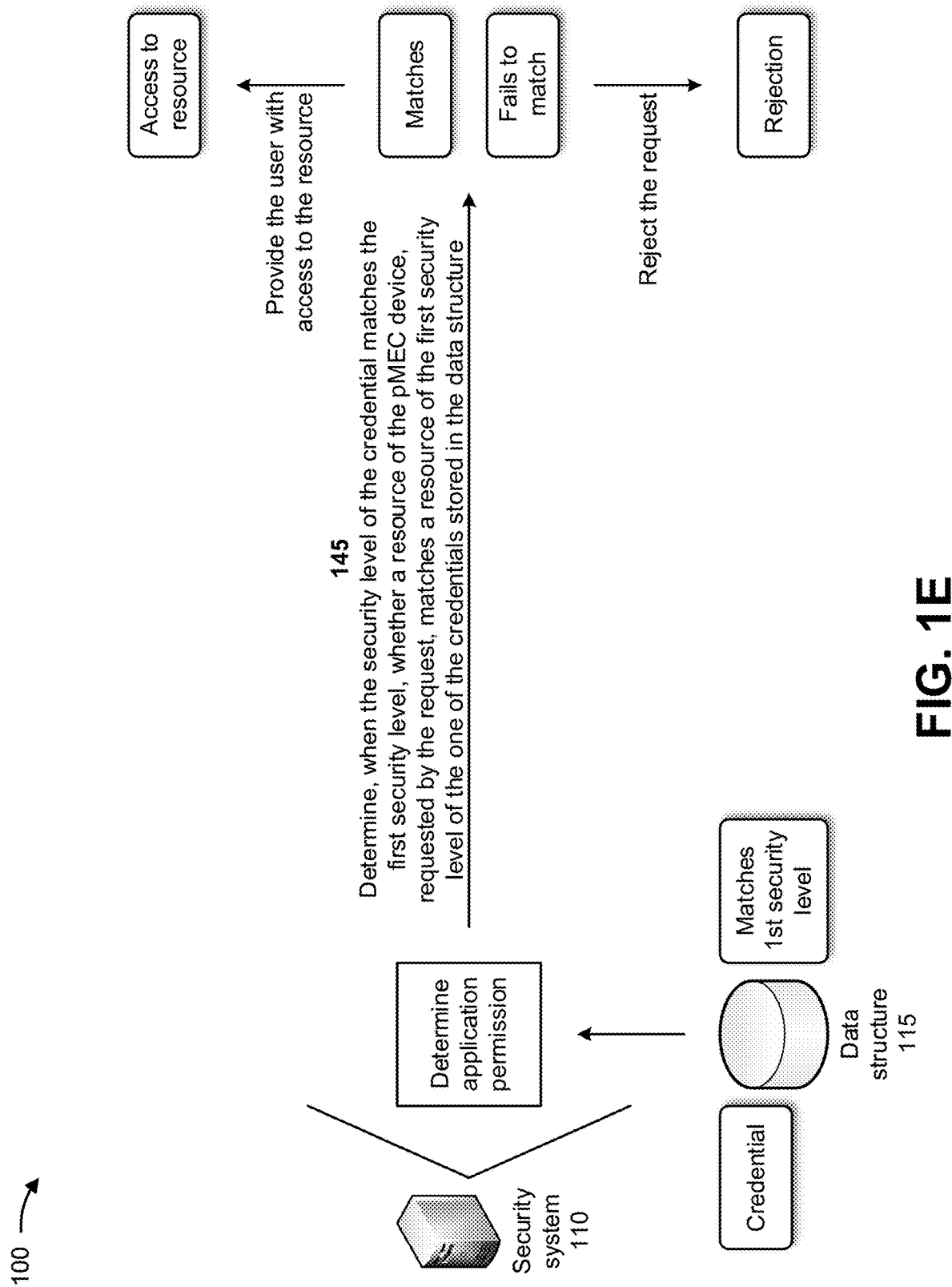

As shown in FIG. 1E, and by reference number 145, the security system 110 may determine, based on the security level of the credential matching the first security level, whether a computing resource of the pMEC device 120, requested by the request, matches a computing resource of the first security level of the one of the credentials stored in the data structure 115. For example, the security system 110 may determine that the security level of the credential indicates that the user satisfies the first security level of the identified credential. Thus, the security system 110 may determine that the security level of the credential matches the first security level of the identified credential stored in the data structure 115. When the security level of the credential matches the first security level of the identified credential, the security system 110 may identify computing resources associated with the first security level of the identified credential stored in the data structure 115. The security system 110 may compare the computing resource of the pMEC device 120 (e.g., requested by the request) and the computing resources associated with the first security level of the identified credential. The security system 110 may determine whether the computing resource of the pMEC device 120 matches the computing resources associated with the first security level of the identified credential based on comparing the computing resource of the pMEC device 120 and the computing resources associated with the first security level of the identified credential.

In some implementations, the security system 110 may determine that the computing resource of the pMEC device 120 matches the computing resources associated with the first security level of the identified credential when the computing resource of the pMEC device 120 of the request is included in the computing resources associated with the first security level of the identified credential. In some implementations, the security system 110 may determine that the computing resource of the pMEC device 120 fails to match the computing resources associated with the first security level of the identified credential when the computing resource of the pMEC device 120 of the request is not included in the computing resources associated with the first security level of the identified credential.

As further shown in FIG. 1E, the security system 110 may provide the user with access to the computing resource when the computing resource of the pMEC device 120 matches the computing resource of the first security level of the one of the credentials stored in the data structure 115. For example, the security system 110 may determine that the computing resource of the pMEC device 120 of the request is included in the computing resources associated with the first security level of the identified credential. Thus, the security system 110 may determine that the computing resource of the pMEC device 120 matches the computing resources associated with the first security level of the identified credential. When the computing resource of the pMEC device 120 matches the computing resources associated with the first security level, the security system 110 may provide the user with access to the computing resource of the pMEC device 120. For example, the security system 110 may enable the user device 105 to connect to and access the computing resource of the pMEC device 120. In some implementations, the security system 110 may provide the user with access to the computing resource based on the computing resource of the pMEC device 120 by establishing a virtual private network (VPN) between the user device 105, the security system 110, and the pMEC device 120 via a cloud computing environment, and providing the user with access to the computing resource via the VPN.

As further shown in FIG. 1E, the security system 110 may reject the request when the computing resource of the pMEC device 120 fails to match the computing resource of the first security level of the one of the credentials stored in the data structure 115. For example, the security system 110 may determine that the computing resource of the pMEC device 120 of the request is not included in the computing resources associated with the first security level of the identified credential. Thus, the security system 110 may determine that the computing resource of the pMEC device 120 fails to match the computing resources associated with the first security level of the identified credential. When the computing resource of the pMEC device 120 fails to match the computing resources associated with the first security level, the security system 110 may reject the request of the user to access the functionality of the pMEC device 120. For example, the security system 110 may deny the user device 105 access to the computing resource of the pMEC device 120, and may provide, to the user device 105, a message indicating that the request was rejected.

Figure 1F:
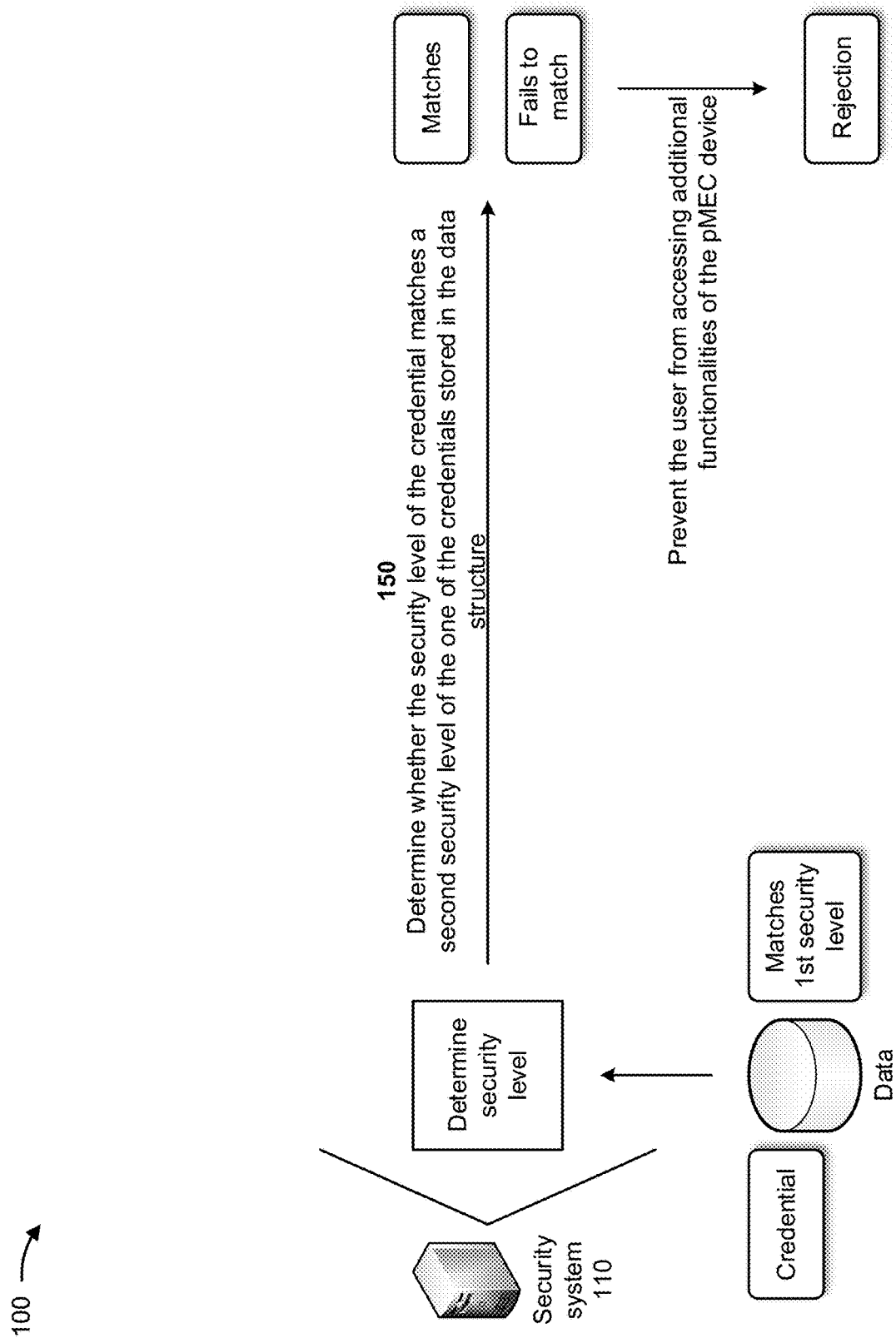

As shown in FIG. 1F, and by reference number 150, the security system 110 may determine whether the security level of the credential matches a second security level of the one of the credentials stored in the data structure 115. For example, when the security level of the credential matches the first security level of the identified credential and the computing resource of the pMEC device 120 matches the computing resources associated with the first security level of the identified credential, the security system 110 may identify the second security level of the identified credential stored in the data structure 115. The security system 110 may compare the security level of the credential and the second security level of the identified credential stored in the data structure 115. The security system 110 may determine whether the security level of the credential matches the second security level of the identified credential stored in the data structure 115 based on comparing the security level of the credential and the second security level of the identified credential.

In some implementations, the security system 110 may determine that the security level of the credential matches the second security level of the identified credential stored in the data structure 115 when the security level of the credential indicates that the user satisfies the second security level of the identified credential (e.g., indicates that the user has access to the operating system of the pMEC device 120). In some implementations, the security system 110 may determine that the security level of the credential fails to match the second security level of the identified credential stored in the data structure 115 when the security level of the credential indicates that the user fails to satisfy the second security level of the identified credential (e.g., indicates that the user does not have access to the operating system of the pMEC device 120).

As further shown in FIG. 1F, the security system 110 may prevent the user from accessing additional functionalities of the pMEC device 120 when the credential fails to match the second security level of the one of the credentials stored in the data structure 115. For example, the security system 110 may determine that the security level of the credential indicates that the user fails to satisfy the second security level of the identified credential. Thus, the security system 110 may determine that the security level of the credential fails to match the second security level of the identified credential stored in the data structure 115. When the security level of the credential fails to match the second security level of the identified credential, the security system 110 may prevent the user from accessing additional functionalities (e.g., the operating system, VM instances, and applications) of the pMEC device 120. For example, the security system 110 may deny the user device 105 access to the additional functionalities of the pMEC device 120, and may provide, to the user device 105, a message indicating that access to additional functionalities is denied.

Figure 1G:
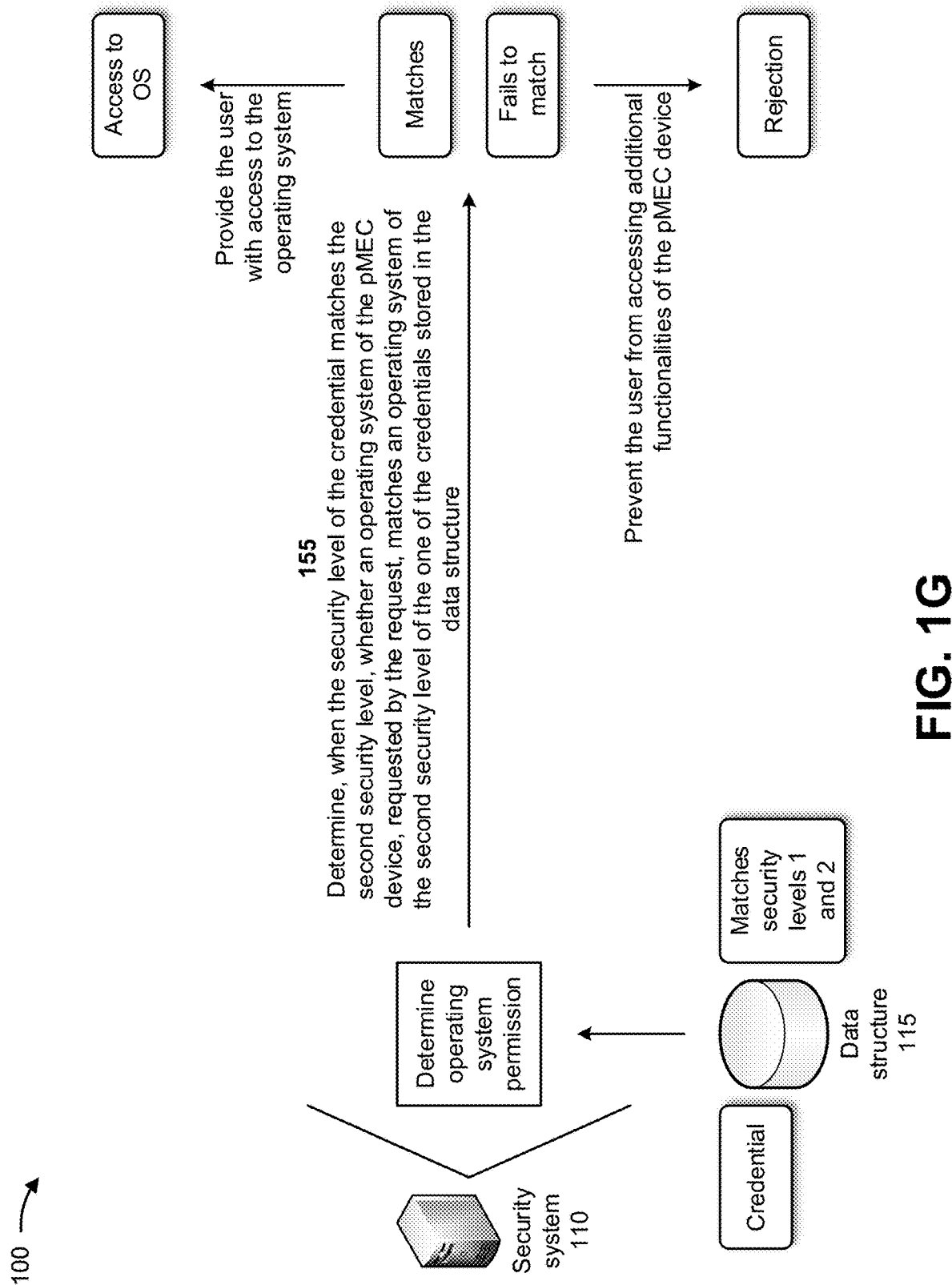

As shown in FIG. 1G, and by reference number 155, the security system 110 may determine, when the security level of the credential matches the second security level, whether an operating system of the pMEC device 120, requested by the request, matches an operating system of the second security level of the one of the credentials stored in the data structure 115. For example, the security system 110 may determine that the security level of the credential indicates that the user satisfies the second security level of the identified credential. Thus, the security system 110 may determine that the security level of the credential matches the second security level of the identified credential stored in the data structure 115. When the security level of the credential matches the second security level of the identified credential, the security system 110 may identify operating systems associated with the second security level of the identified credential stored in the data structure 115. The security system 110 may compare the operating system of the pMEC device 120 (e.g., requested by the request) and the operating systems associated with the second security level of the identified credential. The security system 110 may determine whether the operating system of the pMEC device 120 matches the operating systems associated with the second security level of the identified credential based on comparing the operating system of the pMEC device 120 and the operating systems associated with the second security level of the identified credential.

In some implementations, the security system 110 may determine that the operating system of the pMEC device 120 matches the operating systems associated with the second security level of the identified credential when the operating system of the pMEC device 120 of the request is included in the operating systems associated with the second security level of the identified credential. In some implementations, the security system 110 may determine that the operating system of the pMEC device 120 fails to match the operating systems associated with the second security level of the identified credential when the operating system of the pMEC device 120 of the request is not included in the operating systems associated with the second security level of the identified credential.

As further shown in FIG. 1G, the security system 110 may provide the user with access to the operating system when the operating system matches the operating system of the second security level of the one of the credentials stored in the data structure 115. For example, the security system 110 may determine that the operating system of the pMEC device 120 of the request is included in the operating systems associated with the second security level of the identified credential. Thus, the security system 110 may determine that the operating system of the pMEC device 120 matches the operating systems associated with the second security level of the identified credential. When the operating system of the pMEC device 120 matches the operating systems associated with the second security level, the security system 110 may provide the user with access to the operating system of the pMEC device 120. For example, the security system 110 may enable the user device 105 to connect to and access the operating system of the pMEC device 120.

As further shown in FIG. 1G, the security system 110 may prevent the user from accessing additional functionalities of the pMEC device 120 when the operating system fails to match the operating system of the second security level of the one of the credentials stored in the data structure 115. For example, the security system 110 may determine that the operating system of the pMEC device 120 of the request is not included in the operating systems associated with the second security level of the identified credential. Thus, the security system 110 may determine that the operating system of the pMEC device 120 fails to match the operating systems associated with the second security level of the identified credential. When the operating system of the pMEC device 120 fails to match the operating systems associated with the second security level, the security system 110 may prevent the user from accessing additional functionalities (e.g., the operating system, VM instances, and applications) of the pMEC device 120. For example, the security system 110 may deny the user device 105 access to the additional functionalities of the pMEC device 120, and may provide, to the user device 105, a message indicating that access to additional functionalities is denied.

Figure 1H:
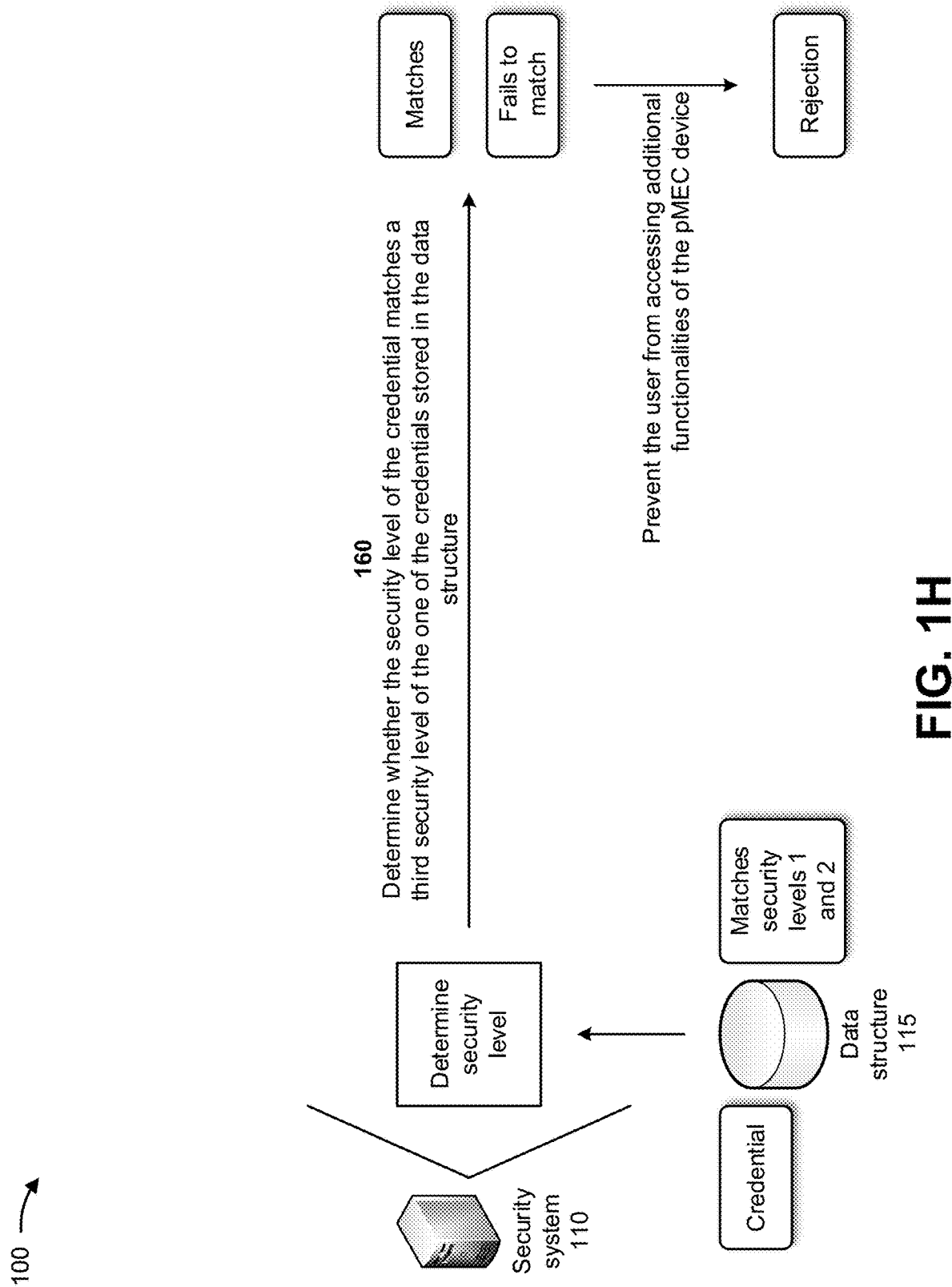

As shown in FIG. 1H, and by reference number 160, the security system 110 may determine whether the security level of the credential matches a third security level of the one of the credentials stored in the data structure 115. For example, when the security level of the credential matches the first and second security levels of the identified credential, the computing resource of the pMEC device 120 matches the computing resources associated with the first security level, and the operating system of the pMEC device 120 matches the operating systems associated with the second security level, the security system 110 may identify the third security level of the identified credential stored in the data structure 115. The security system 110 may compare the security level of the credential and the third security level of the identified credential stored in the data structure 115. The security system 110 may determine whether the security level of the credential matches the third security level of the identified credential stored in the data structure 115 based on comparing the security level of the credential and the third security level of the identified credential.

In some implementations, the security system 110 may determine that the security level of the credential matches the third security level of the identified credential stored in the data structure 115 when the security level of the credential indicates that the user satisfies the third security level of the identified credential (e.g., indicates that the user has access to VM instances of the pMEC device 120). In some implementations, the security system 110 may determine that the security level of the credential fails to match the third security level of the identified credential stored in the data structure 115 when the security level of the credential indicates that the user fails to satisfy the third security level of the identified credential (e.g., indicates that the user does not have access to the VM instances of the pMEC device 120).

As further shown in FIG. 1H, the security system 110 may prevent the user from accessing additional functionalities of the pMEC device 120 when the credential fails to match the third security level of the one of the credentials stored in the data structure 115. For example, the security system 110 may determine that the security level of the credential indicates that the user fails to satisfy the third security level of the identified credential. Thus, the security system 110 may determine that the security level of the credential fails to match the third security level of the identified credential stored in the data structure 115. When the security level of the credential fails to match the third security level of the identified credential, the security system 110 may prevent the user from accessing additional functionalities (e.g., VM instances and applications) of the pMEC device 120. For example, the security system 110 may deny the user device 105 access to the additional functionalities of the pMEC device 120, and may provide, to the user device 105, a message indicating that access to additional functionalities is denied.

Figure 1I:
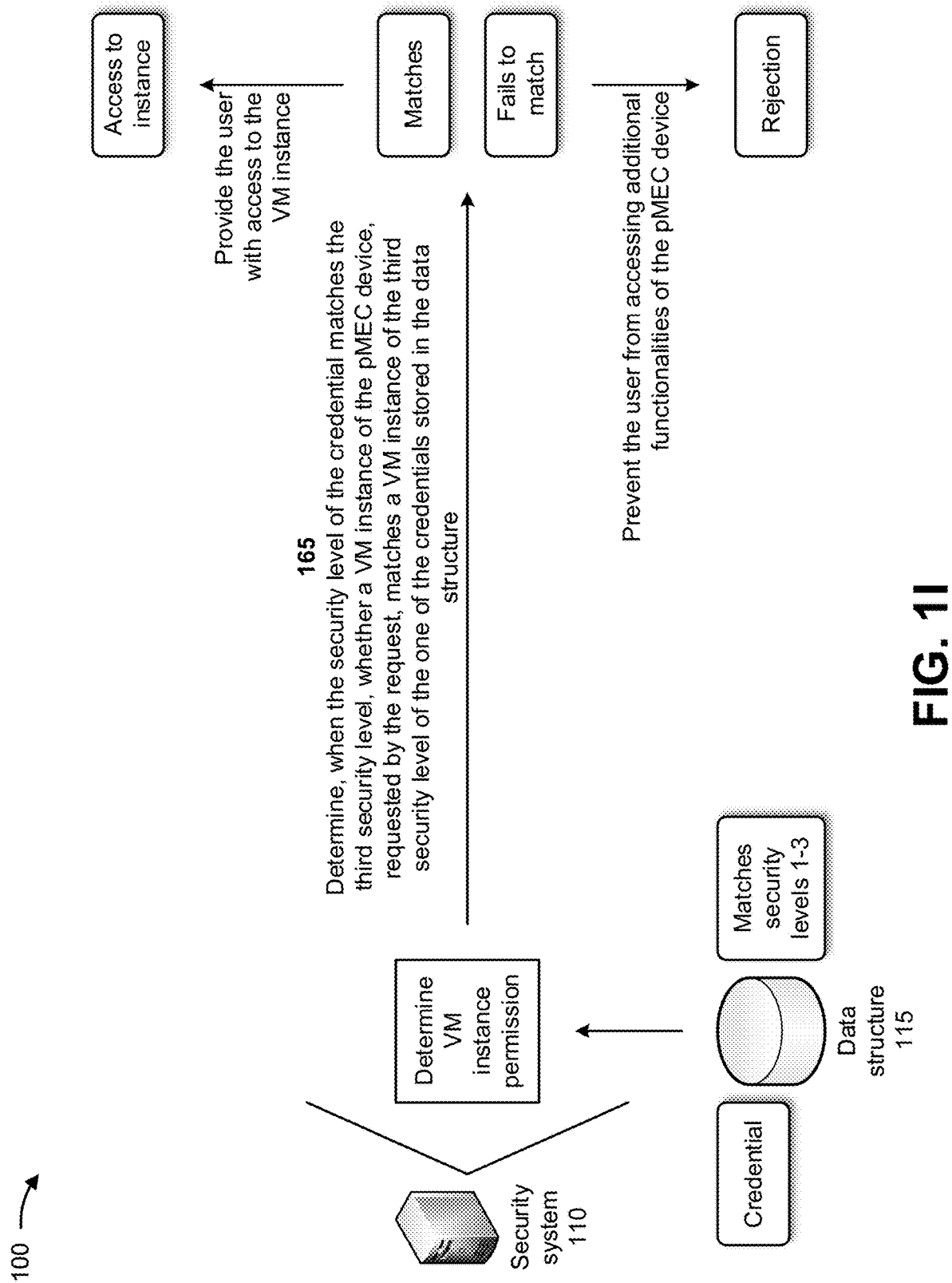

As shown in FIG. 1I, and by reference number 165, the security system 110 may determine, when the security level of the credential matches the third security level, whether a VM instance of the pMEC device 120, requested by the request, matches a VM instance of the third security level of the one of the credentials stored in the data structure 115. For example, the security system 110 may determine that the security level of the credential indicates that the user satisfies the third security level of the identified credential. Thus, the security system 110 may determine that the security level of the credential matches the third security level of the identified credential stored in the data structure 115. When the security level of the credential matches the third security level of the identified credential, the security system 110 may identify VM instances associated with the third security level of the identified credential stored in the data structure 115. The security system 110 may compare the VM instance of the pMEC device 120 (e.g., requested by the request) and the VM instances associated with the third security level of the identified credential. The security system 110 may determine whether the VM instance of the pMEC device 120 matches the VM instances associated with the third security level of the identified credential based on comparing the VM instance of the pMEC device 120 and the VM instances associated with the third security level of the identified credential.

In some implementations, the security system 110 may determine that the VM instance of the pMEC device 120 matches the VM instances associated with the third security level of the identified credential when the VM instance of the pMEC device 120 of the request is included in the VM instances associated with the third security level of the identified credential. In some implementations, the security system 110 may determine that the VM instance of the pMEC device 120 fails to match the VM instances associated with the third security level of the identified credential when the VM instance of the pMEC device 120 of the request is not included in the VM instances associated with the third security level of the identified credential.

As further shown in FIG. 1I, the security system 110 may provide the user with access to the VM instance when the VM instance matches the VM instance of the third security level of the one of the credentials stored in the data structure 115. For example, the security system 110 may determine that the VM instance of the pMEC device 120 of the request is included in the VM instances associated with the third security level of the identified credential. Thus, the security system 110 may determine that the VM instance of the pMEC device 120 matches the VM instances associated with the third security level of the identified credential. When the VM instance of the pMEC device 120 matches the VM instances associated with the third security level, the security system 110 may provide the user with access to the VM instance of the pMEC device 120. For example, the security system 110 may enable the user device 105 to connect to and access the VM instance of the pMEC device 120.

As further shown in FIG. 1I, the security system 110 may prevent the user from accessing additional functionalities of the pMEC device 120 when the VM instance fails to match the VM instance of the third security level of the one of the credentials stored in the data structure 115. For example, the security system 110 may determine that the VM instance of the pMEC device 120 of the request is not included in the VM instances associated with the third security level of the identified credential. Thus, the security system 110 may determine that the VM instance of the pMEC device 120 fails to match the VM instances associated with the third security level of the identified credential. When the VM instance of the pMEC device 120 fails to match the VM instances associated with the third security level, the security system 110 may prevent the user from accessing additional functionalities (e.g., VM instances and applications) of the pMEC device 120. For example, the security system 110 may deny the user device 105 access to the additional functionalities of the pMEC device 120, and may provide, to the user device 105, a message indicating that access to additional functionalities is denied.

Figure 1J:
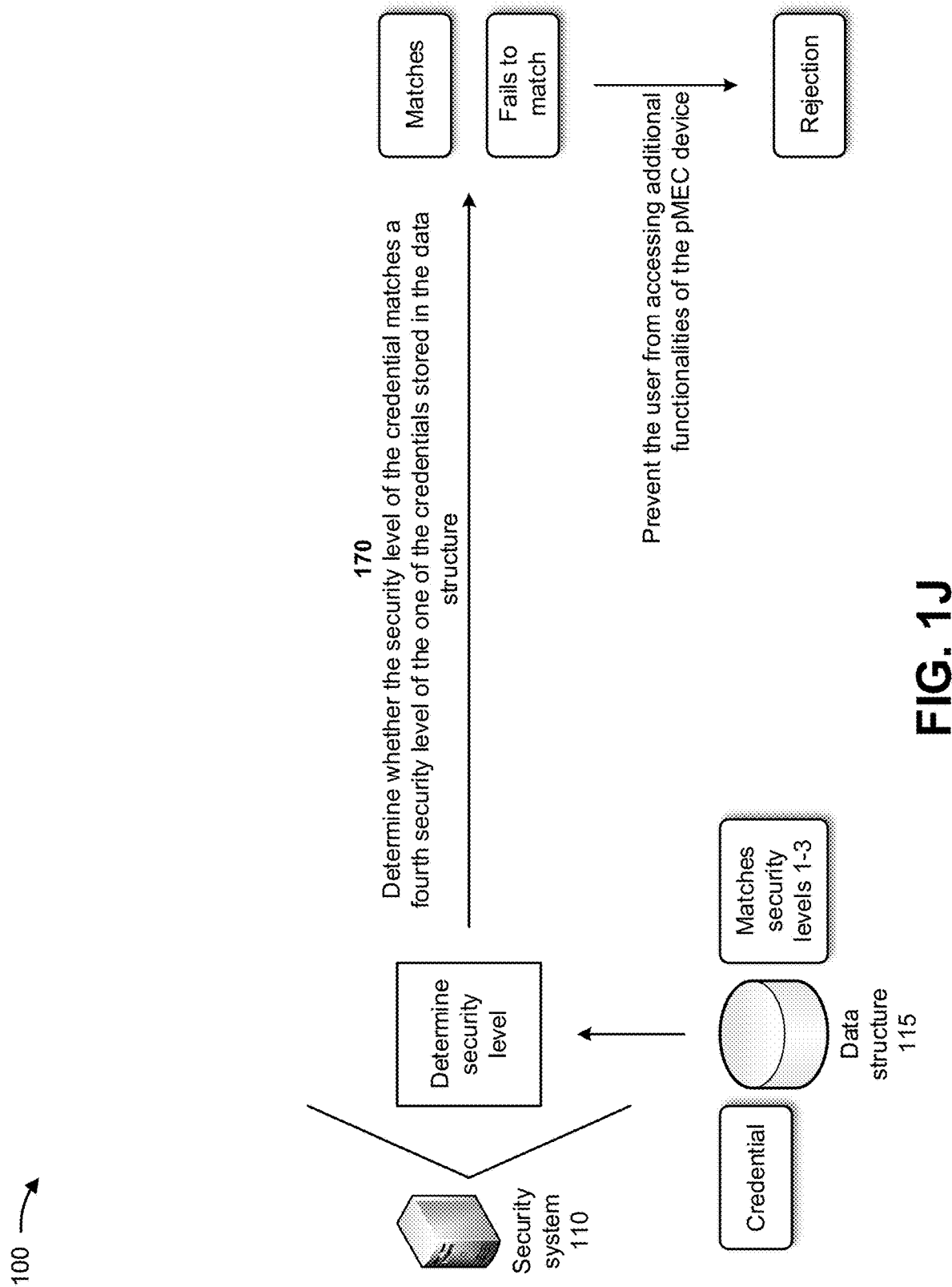

As shown in FIG. 1J, and by reference number 170, the security system 110 may determine whether the security level of the credential matches a fourth security level of the one of the credentials stored in the data structure 115. For example, when the security level of the credential matches the first, second, and third security levels of the identified credential, the computing resource of the pMEC device 120 matches the computing resources associated with the first security level, the operating system of the pMEC device 120 matches the operating systems associated with the second security level, and the VM instance of the pMEC device 120 matches the VM instances associated with the third security level, the security system 110 may identify the fourth security level of the identified credential stored in the data structure 115. The security system 110 may compare the security level of the credential and the fourth security level of the identified credential stored in the data structure 115. The security system 110 may determine whether the security level of the credential matches the fourth security level of the identified credential stored in the data structure 115 based on comparing the security level of the credential and the fourth security level of the identified credential.

In some implementations, the security system 110 may determine that the security level of the credential matches the fourth security level of the identified credential stored in the data structure 115 when the security level of the credential indicates that the user satisfies the fourth security level of the identified credential (e.g., indicates that the user has access to applications of the pMEC device 120). In some implementations, the security system 110 may determine that the security level of the credential fails to match the fourth security level of the identified credential stored in the data structure 115 when the security level of the credential indicates that the user fails to satisfy the fourth security level of the identified credential (e.g., indicates that the user does not have access to the applications of the pMEC device 120).

As further shown in FIG. 1J, the security system 110 may prevent the user from accessing additional functionalities of the pMEC device 120 when the security level of the credential fails to match the fourth security level of the one of the credentials stored in the data structure 115. For example, the security system 110 may determine that the security level of the credential indicates that the user fails to satisfy the fourth security level of the identified credential. Thus, the security system 110 may determine that the security level of the credential fails to match the fourth security level of the identified credential stored in the data structure 115. When the security level of the credential fails to match the fourth security level of the identified credential, the security system 110 may prevent the user from accessing additional functionalities (e.g., applications) of the pMEC device 120. For example, the security system 110 may deny the user device 105 access to the additional functionalities of the pMEC device 120, and may provide, to the user device 105, a message indicating that access to additional functionalities is denied.

Figure 1K:
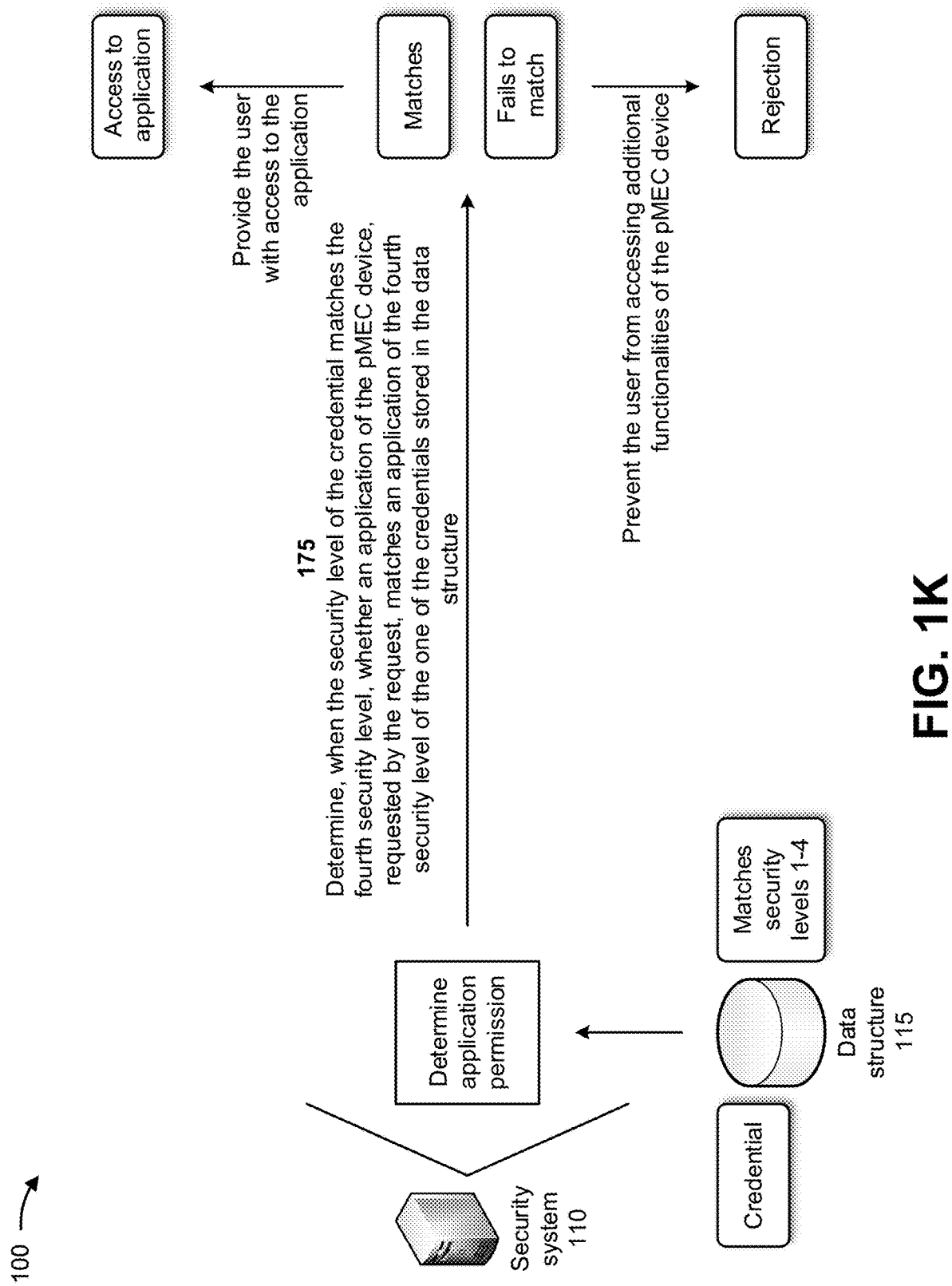

As shown in FIG. 1K, and by reference number 175, the security system 110 may determine, when the security level of the credential matches the fourth security level, whether an application of the pMEC device 120, requested by the request, matches an application of the fourth security level of the one of the credentials stored in the data structure 115. For example, the security system 110 may determine that the security level of the credential indicates that the user satisfies the fourth security level of the identified credential. Thus, the security system 110 may determine that the security level of the credential matches the fourth security level of the identified credential stored in the data structure 115. When the security level of the credential matches the fourth security level of the identified credential, the security system 110 may identify applications associated with the fourth security level of the identified credential stored in the data structure 115. The security system 110 may compare the application of the pMEC device 120 (e.g., requested by the request) and the applications associated with the fourth security level of the identified credential. The security system 110 may determine whether the application of the pMEC device 120 matches the applications associated with the fourth security level of the identified credential based on comparing the application of the pMEC device 120 and the applications associated with the fourth security level of the identified credential.

In some implementations, the security system 110 may determine that the application of the pMEC device 120 matches the applications associated with the fourth security level of the identified credential when the application of the pMEC device 120 of the request is included in the applications associated with the fourth security level of the identified credential. In some implementations, the security system 110 may determine that the application of the pMEC device 120 fails to match the applications associated with the fourth security level of the identified credential when the application of the pMEC device 120 of the request is not included in the applications associated with the third security level of the identified credential.

As further shown in FIG. 1K, the security system 110 may provide the user with access to the application when the application matches the application of the fourth security level of the one of the credentials stored in the data structure 115. For example, the security system 110 may determine that the application of the pMEC device 120 of the request is included in the applications associated with the fourth security level of the identified credential. Thus, the security system 110 may determine that the application of the pMEC device 120 matches the applications associated with the fourth security level of the identified credential. When the application of the pMEC device 120 matches the applications associated with the fourth security level, the security system 110 may provide the user with access to the application of the pMEC device 120. For example, the security system 110 may enable the user device 105 to connect to and access the application of the pMEC device 120.

As further shown in FIG. 1K, the security system 110 may prevent the user from accessing additional functionalities of the pMEC device 120 when the application fails to match the application of the fourth security level of the one of the credentials stored in the data structure 115. For example, the security system 110 may determine that the application of the pMEC device 120 of the request is not included in the applications associated with the fourth security level of the identified credential. Thus, the security system 110 may determine that the application of the pMEC device 120 fails to match the applications associated with the fourth security level of the identified credential. When the application of the pMEC device 120 fails to match the applications associated with the fourth security level, the security system 110 may prevent the user from accessing additional functionalities (e.g., applications) of the pMEC device 120. For example, the security system 110 may deny the user device 105 access to the additional functionalities of the pMEC device 120, and may provide, to the user device 105, a message indicating that access to additional functionalities is denied.

In this way, the security system 110 provides secure access to the pMEC device 120 via a multi-tenancy environment. For example, the security system 110 may enable a user (e.g., a network technician, an independent service vendor, a customer, and/or the like), via the user device 105, to securely access different functionalities of the pMEC device 120 with a single credential. The security system 110 may provide access to an infrastructure (e.g., computing resources) level of the pMEC device 120, an operating system (e.g., hypervisor) level of the pMEC device 120, a VM instances level of the pMEC device 120, and/or an application level of the pMEC device 120. Thus, the security system 110 may conserve computing resources, networking resources, and/or other resources that would have otherwise been consumed by permitting security breaches of the pMEC device 120, discovering the security breaches of the pMEC device 120, managing a large quantity of credentials, receiving incorrect credentials, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
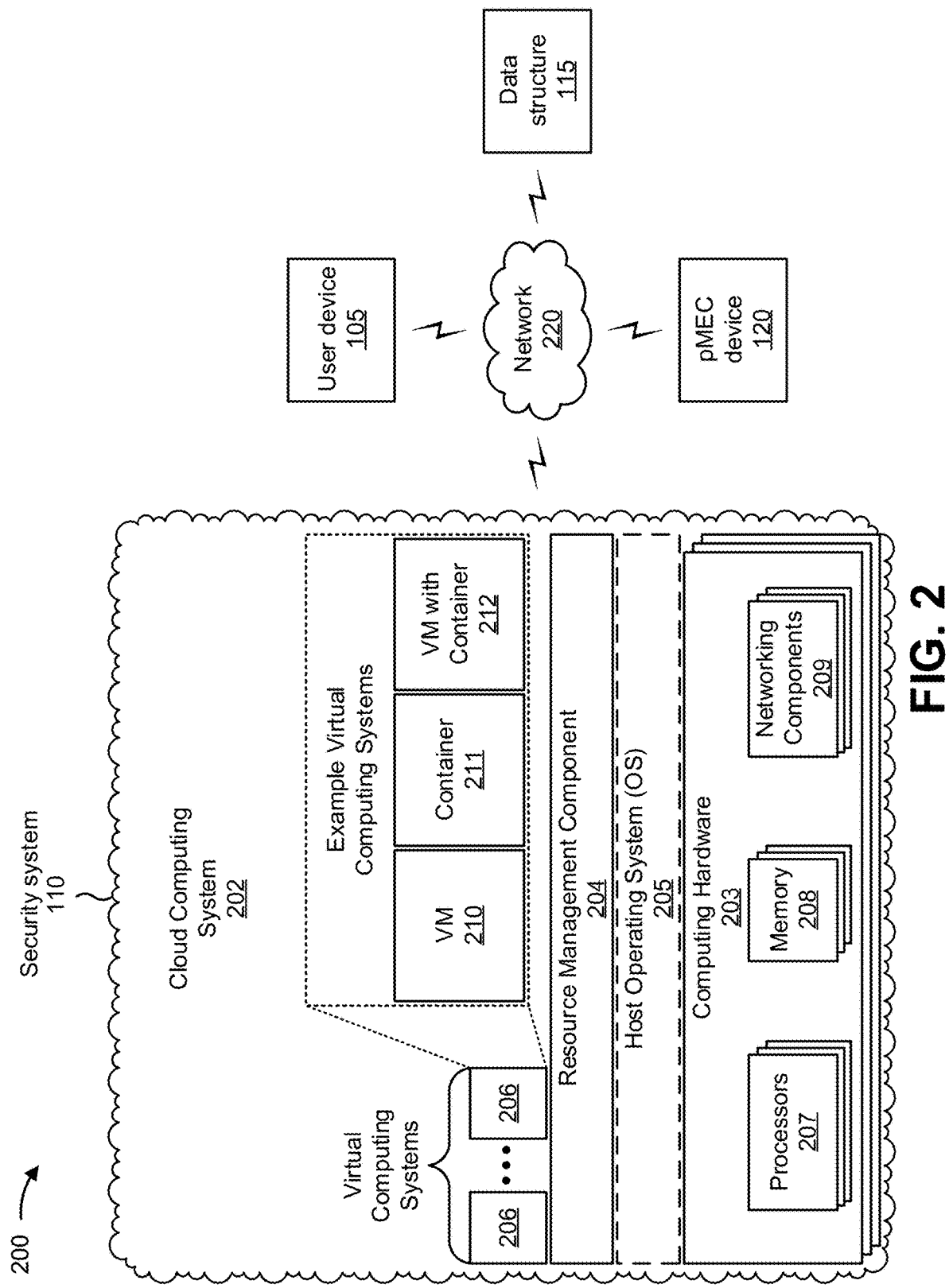
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the security system 110, which may include one or more elements of and/or may execute within a cloud computing system 202. The cloud computing system 202 may include one or more elements 203-212, as described in more detail below. As further shown in FIG. 2, the environment 200 may include a network 220, the user device 105, the data structure 115, and/or pMEC device 120. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data structure 115 includes one or more devices capable of receiving, generating, storing, processing, and/or providing information, as described elsewhere herein. The data structure 115 may include a communication device and/or a computing device. For example, the data structure 115 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 115 may communicate with one or more other devices of the environment 200, as described elsewhere herein.

The pMEC device 120 includes one or more devices capable of receiving, generating, storing, processing, providing, and/or routing information, as described elsewhere herein. The pMEC device 120 may include a communication device and/or a computing device. For example, the pMEC device 120 may include a server, such as an application server, a client server, a web server, a database server, a host server, a proxy server, a virtual server (e.g., executing on computing hardware), or a server in a cloud computing system. In some implementations, the pMEC device 120 includes computing hardware used in a cloud computing environment. In some implementations, the security system 110 may be a pMEC device, such as the pMEC device 120.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the security system 110 may include one or more elements 203-212 of the cloud computing system 202, may execute within the cloud computing system 202, and/or may be hosted within the cloud computing system 202, in some implementations, the security system 110 may not be cloud-based (e.g., may be implemented outside of a cloud computing system) or may be partially cloud-based. For example, the security system 110 may include one or more devices that are not part of the cloud computing system 202, such as device 300 of FIG. 3, which may include a stand-alone server or another type of computing device. The security system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
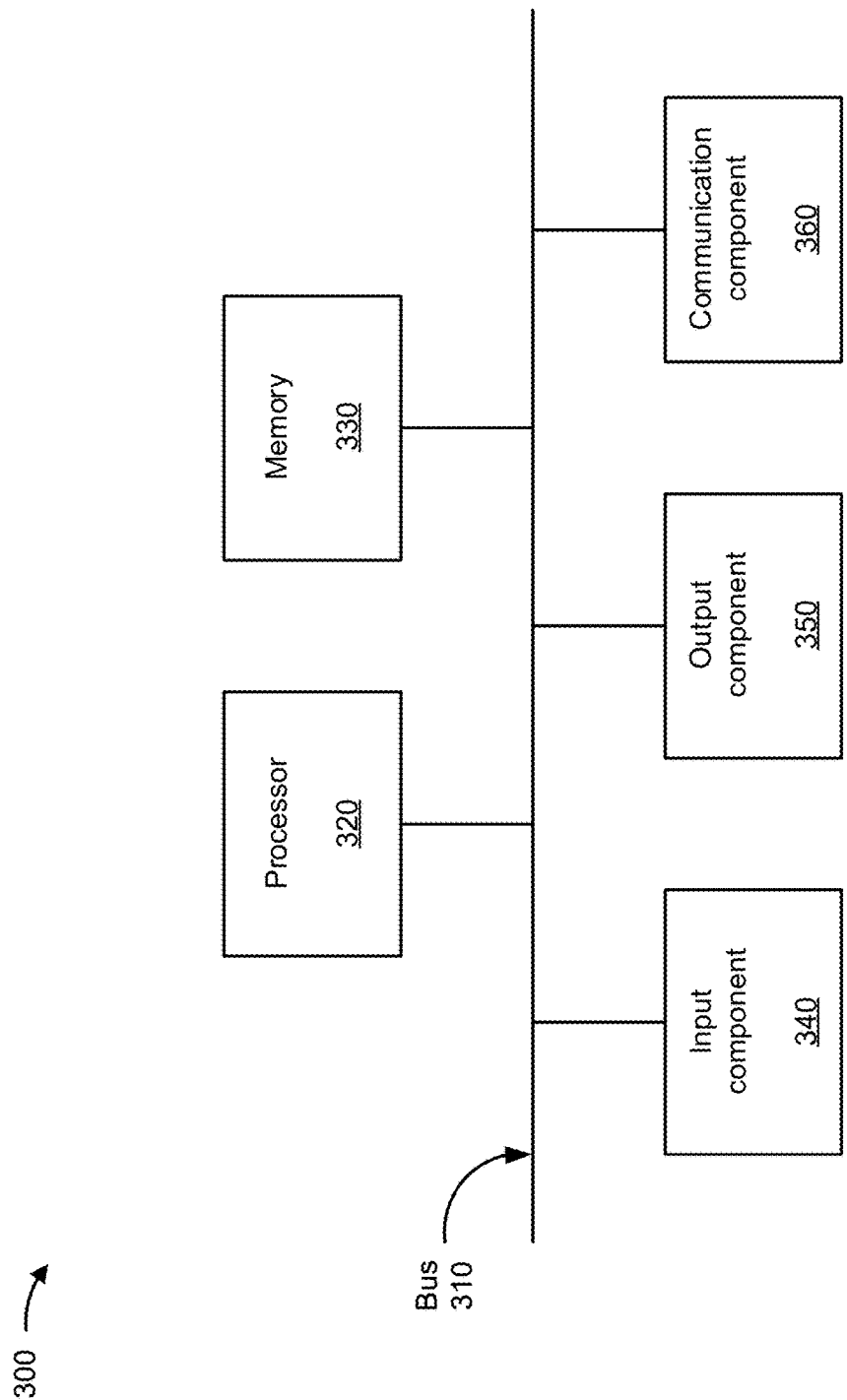
FIG. 3 is a diagram of example components of one or more devices of FIG. 2.

FIG. 3 is a diagram of example components of a device 300, which may correspond to the user device 105, the security system 110, the data structure 115, and/or the pMEC device 120. In some implementations, the user device 105, the security system 110, the data structure 115, and/or the pMEC device 120 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
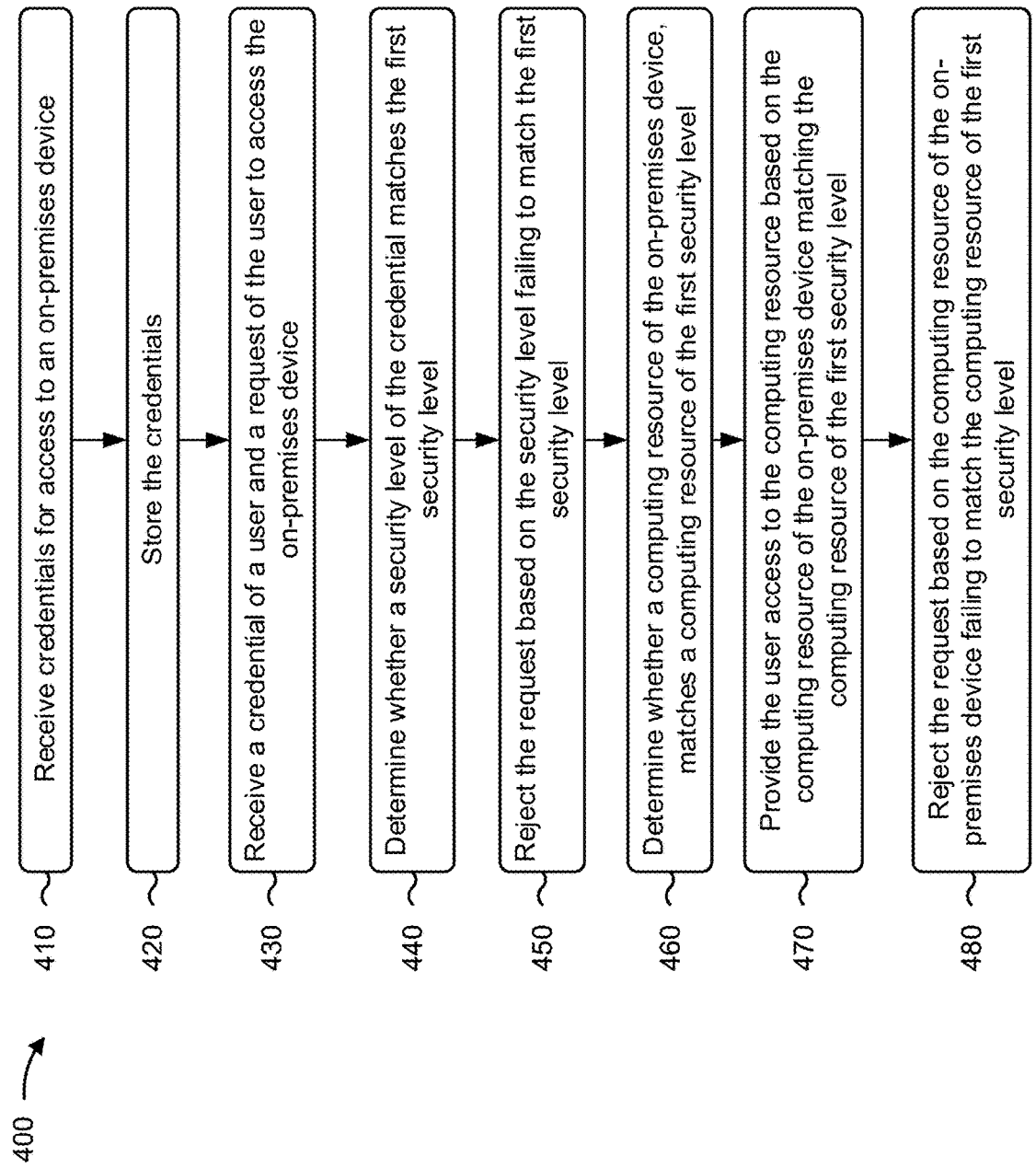
FIG. 4 is a flowchart of an example process for providing secure access to a pMEC device via a multi-tenancy environment.

FIG. 4 is a flowchart of an example process 400 for providing secure access to a pMEC device via a multi-tenancy environment. In some implementations, one or more process blocks of FIG. 4 may be performed by a device (e.g., the security system 110). In some implementations, one or more process blocks of FIG. 4 may be performed by another device or a group of devices separate from or including the device, such as a user device (e.g., the user device 105) and/or a pMEC device (e.g., the pMEC device 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving credentials identifying security levels of users for access to functionalities of an on-premises device (block 410). For example, the device may receive credentials identifying security levels of users for access to functionalities of an on-premises device, as described above. In some implementations, the different security levels include a first security level associated with accessing computing resources of the on-premises device, a second security level associated with accessing an operating system of the on-premises device, a third security level associated with accessing VM instances of the on-premises device, and a fourth security level associated with accessing applications of the on-premises device. In some implementations, the on-premises device is a pMEC device. In some implementations, the device communicates with the on-premises device via a cloud computing environment. In some implementations, the credentials provide authorization and authentication of the users for access to the functionalities of the on-premises device.

As further shown in FIG. 4, process 400 may include storing the credentials in a data structure (block 420). For example, the device may store the credentials in a data structure, as described above.

As further shown in FIG. 4, process 400 may include receiving a credential of a user and a request of the user to access a functionality of the on-premises device (block 430). For example, the device may receive a credential of a user and a request of the user to access a functionality of the on-premises device, as described above. In some implementations, the credential includes one or more keys associated with one or more of the security levels.

As further shown in FIG. 4, process 400 may include determining whether a security level of the credential matches the first security level of one of the credentials stored in the data structure (block 440). For example, the device may determine whether a security level of the credential matches the first security level of one of the credentials stored in the data structure, as described above. In some implementations, the first security level is associated with computing resources provided by the on-premises device.

As further shown in FIG. 4, process 400 may include rejecting the request based on the security level of the credential failing to match the first security level of the one of the credentials (block 450). For example, the device may reject the request based on the security level of the credential failing to match the first security level of the one of the credentials, as described above.

As further shown in FIG. 4, process 400 may include determining, based on the security level of the credential matching the first security level, whether a computing resource of the on-premises device, requested by the request, matches a computing resource of the first security level of the one of the credentials (block 460). For example, the device may determine, based on the security level of the credential matching the first security level, whether a computing resource of the on-premises device, requested by the request, matches a computing resource of the first security level of the one of the credentials, as described above.

As further shown in FIG. 4, process 400 may include providing the user with access to the computing resource based on the computing resource of the on-premises device matching the computing resource of the first security level of the one of the credentials (block 470). For example, the device may provide the user with access to the computing resource based on the computing resource of the on-premises device matching the computing resource of the first security level of the one of the credentials, as described above. In some implementations, providing the user with access to the computing resource based on the computing resource of the on-premises device matching the computing resource of the first security level of the one of the credentials includes establishing a virtual private network between the device and the on-premises device via a cloud computing environment, and providing the user with access to the computing resource via the virtual private network.

As further shown in FIG. 4, process 400 may include rejecting the request based on the computing resource of the on-premises device failing to match the computing resource of the first security level of the one of the credentials (block 480). For example, the device may reject the request based on the computing resource of the on-premises device failing to match the computing resource of the first security level of the one of the credentials, as described above.

In some implementations, process 400 includes determining whether the security level of the credential matches the second security level of the one of the credentials; preventing the user from accessing additional functionalities of the on-premises device based on the security level of the credential failing to match the second security level of the one of the credentials; determining, based on the security level of the credential matching the second security level, whether an operating system of the on-premises device, requested by the request, matches an operating system of the second security level of the one of the credentials; and providing the user with access to the operating system based on the operating system matching the operating system of the second security level of the one of the credentials. In some implementations, process 400 includes preventing the user from accessing additional functionalities of the on-premises device based on the operating system failing to match the operating system of the second security level of the one of the credentials.

In some implementations, process 400 includes determining whether the security level of the credential matches the third security level of the one of the credentials; preventing the user from accessing additional functionalities of the on-premises device based on the security level of the credential failing to match the third security level of the one of the credentials; determining, based on the security level of the credential matching the third security level, whether a VM instance of the on-premises device, requested by the request, matches a VM instance of the third security level of the one of the credentials; and providing the user with access to the VM instance based on the VM instance matching the VM instance of the third security level of the one of the credentials. In some implementations, process 400 includes preventing the user from accessing additional functionalities of the on-premises device based on the VM instance failing to match the VM instance of the third security level of the one of the credentials.

In some implementations, process 400 includes determining whether the security level of the credential matches the fourth security level of the one of the credentials; preventing the user from accessing additional functionalities of the on-premises device based on the security level of the credential failing to match the fourth security level of the one of the credentials; determining, based on the security level of the credential matching the fourth security level, whether an application of the on-premises device, requested by the request, matches an application of the fourth security level of the one of the credentials; and providing the user with access to the application based on the application matching the application of the fourth security level of the one of the credentials. In some implementations, process 400 includes preventing the user from accessing additional functionalities of the on-premises device based on the application failing to match the application of the fourth security level of the one of the credentials.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, credentials identifying different security levels of users for access to functionalities of an on-premises device,
    wherein the different security levels include:
      a first security level associated with accessing computing resources of the on-premises device,
      a second security level associated with, when a user is authorized to access one or more of the computing resources, whether the user is authorized to access one or more operating systems, of a plurality of operating systems of the on-premises device,
        wherein the user is not authorized to access the plurality of operating systems when the user is not authorized to access the one or more of the computing resources,
      a third security level associated with, when the user is authorized to access the one or more operating systems, whether the user is authorized to access one or more virtual machine (VM) instances of a plurality of VM instances of the on-premises device,
        wherein the user is not authorized to access the one or more VM instances when the user is not authorized to access the operating system, and
      a fourth security level associated with, when the user is authorized to access the one or more VM instances, whether the user is authorized to access one or more applications of a plurality of applications of the on-premises device,
        wherein the user is not authorized to access the one or more applications when the user is not authorized to access the one or more VM instances;
  storing, by the device, the credentials in a data structure;
  receiving, by the device, a credential of the user and a request of the user to access a functionality of the functionalities of the on-premises device,
    wherein the credential of the user comprises a single credential of the user that is generated by the on-premises device for the user,
      wherein the credential is generated based on one of the credentials stored in the data structure;
  determining, by the device, that a security level of the credential matches the first security level of the one of the credentials stored in the data structure,
    wherein the request is rejected when the security level of the credential fails to match the first security level of the one of the credentials;
  determining, by the device and based on the security level of the credential matching the first security level, that a computing resource of the on-premises device, requested by the request, matches a computing resource of the first security level of the one of the credentials; and
  providing, by the device, the user with access to the computing resource of the on-premises device based on the computing resource of the on-premises device matching the computing resource of the first security level of the one of the credentials,
  wherein the request is rejected when the computing resource of the on-premises device fails to match the computing resource of the first security level of the one of the credentials, and
  wherein the user is not provided access a remaining set of computing resources of the computing resources of the on-premises device based on the remaining set of computing resources not being indicated by the first security level of the one of the credentials.

2. The method of claim 1, further comprising:
  determining that the security level of the credential matches a second security level of the one of the credentials,
    wherein the user is prevented from accessing additional functionalities of the on-premises device when the security level of the credential fails to match the second security level of the one of the credentials;
  determining, based on the security level of the credential matching the second security level, that an operating system of the on-premises device, requested by the request, matches an operating system of the second security level of the one of the credentials; and
  providing the user with access to the operating system based on the operating system matching the operating system of the second security level of the one of the credentials,
    wherein the user is prevented from accessing the plurality of operating systems when the operating system fails to match the operating system of the second security level of the one of the credentials.

3. The method of claim 2, wherein the request requests access to another operating system of the plurality of operating systems of the on-premises device, the method further comprising:
  preventing the user from accessing additional functionalities of the on-premises device based on the other operating system failing to match the operating system of the second security level of the one of the credentials.

4. The method of claim 2, further comprising:
  determining that the security level matches the third security level of the one of the credentials,
    wherein the user is prevented from accessing additional functionalities of the on-premises device when the security level fails to match the third security level of the one of the credentials;
  determining, based on the security level of the credential matching the third security level of the one of the credentials, that a VM instance of the on-premises device, requested by the request, matches a VM instance of the third security level of the one of the credentials; and
  providing the user with access to the VM instance based on the VM instance matching the VM instance of the third security level of the one of the credentials.

5. The method of claim 4, wherein the user is prevented from accessing additional functionalities of the on-premises device when the VM instance fails to match the VM instance of the third security level of the one of the credentials.

6. The method of claim 4, further comprising:
  determining that the security level of the credential matches the fourth security level of the one of the credentials,
    wherein the user is prevented from accessing additional functionalities of the on-premises device when the security level of the credential fails to match the fourth security level of the one of the credentials;
  determining, based on the security level of the credential matching the fourth security level, that an application of the on-premises device, requested by the request, matches an application of the fourth security level of the one of the credentials; and
  providing the user with access to the application based on the application matching the application of the fourth security level of the one of the credentials.

7. The method of claim 6, wherein the user is prevented from accessing additional functionalities of the on-premises device when the application fails to match the application of the fourth security level of the one of the credentials.

8. A device, comprising:
  one or more processors configured to:
    receive credentials identifying different security levels of users for access to functionalities of an on-premises device, wherein the different security levels include:
      a first security level associated with accessing computing resources of the on-premises device,
      a second security level associated with, when a user is authorized to access one or more of the computing resources, whether the user is authorized to access one or more operating systems, of a plurality of operating systems of the on-premises device,
        wherein the user is not authorized to access the plurality of operating systems when the user is not authorized to access the one or more of the computing resources,
      a third security level associated with, when the user is authorized to access the one or more operating systems, whether the user is authorized to access one or more virtual machine (VM) instances of a plurality of VM instances of the on-premises device,
        wherein the user is not authorized to access the one or more VM instances when the user is not authorized to access the operating system, and
      a fourth security level associated with, when the user is authorized to access the one or more VM instances, whether the user is authorized to access one or more applications of a plurality of applications of the on-premises device,
        wherein the user is not authorized to access the one or more applications when the user is not authorized to access the one or more VM instances;
    store the credentials in a data structure;
    receive a credential of the user and a request of the user to access a functionality of the on-premises device,
      wherein the credential of the user comprises a single credential of the user that is generated by the on-premises device for the user,
      wherein the credential is generated based on one of the credentials stored in the data structure;
    determine whether a security level of the credential matches a first security level of one of the credentials stored in the data structure,
      wherein the request is rejected when the security level of the credential fails to match the first security level of the one of the credentials;
    determine, based on the security level of the credential matching the first security level, that a computing resource of the on-premises device, requested by the request, matches a computing resource of the first security level of the one of the credentials; and provide the user with access to the computing resource based on the computing resource of the on-premises device matching the computing resource of the first security level of the one of the credentials, wherein the request is rejected when the computing resource of the on-premises device fails to match the computing resource of the first security level of the one of the credentials.

9. The device of claim 8, wherein the on-premises device is a private multi-access edge computing device.

10. The device of claim 8, wherein the one or more processors are further configured to:

determine that the security level of the credential matches a second security level of the one of the credentials, wherein the user is prevented from accessing additional functionalities of the on-premises device when the security level of the credential fails to match the second security level of the one of the credentials;

determine, based on the security level of the credential matching the second security level, that an operating system of the on-premises device, requested by the request, matches an operating system of the second security level of the one of the credentials; and provide the user with access to the operating system based on the operating system matching the operating system of the second security level of the one of the credentials, wherein the user is prevented from accessing the plurality of operating systems when the operating system fails to match the operating system of the second security level of the one of the credentials.

11. The device of claim 8, wherein the one or more processors, to provide the user with access to the computing resource based on the computing resource of the on-premises device matching the computing resource of the first security level of the one of the credentials, are configured to:

establish a virtual private network between the device and the on-premises device via a cloud computing environment; and provide the user with access to the computing resource via the virtual private network.

12. The device of claim 8, wherein the device communicates with the on-premises device via a cloud computing environment.

13. The device of claim 8, wherein the credential includes one or more keys associated with one or more of the different security levels.

14. The device of claim 8, wherein the credentials provide authorization and authentication of the users for access to the functionalities of the on-premises device.

15. A non-transitory computer-readable medium storing a set of instructions, the set of instructions comprising:

one or more instructions that, when executed by one or more processors of a device, cause the device to:

receive credentials identifying different security levels of users for access to functionalities of an on-premises device, wherein the different security levels include:

a first security level associated with accessing computing resources of the on-premises device, a second security level associated with, when a user is authorized to access one or more of the computing resources, whether the user is authorized to access one or more operating systems, of a plurality of operating systems of the on-premises device, wherein the user is not authorized to access the plurality of operating systems when the user is not authorized to access the one or more of the computing resources, a third security level associated with, when the user is authorized to access the one or more operating systems, whether the user is authorized to access one or more virtual machine (VM) instances of a plurality of VM instances of the on-premises device, wherein the user is not authorized to access the one or more VM instances when the user is not authorized to access the operating system, and a fourth security level associated with, when the user is authorized to access the one or more VM instances, whether the user is authorized to access one or more applications of a plurality of applications of the on-premises device, wherein the user is not authorized to access the one or more applications when the user is not authorized to access the one or more VM instances;

store the credentials in a data structure;

receive a credential of the user and a request of the user to access a functionality of the on-premises device, wherein the credential of the user comprises a single credential of the user that is generated by the on-premises device for the user, wherein the credential is generated based on one of the credentials stored in the data structure;

determine, based on a security level of the credential matching a first security level of the one of the credentials stored in the data structure, that a computing resource of the on-premises device, requested by the request, matches a computing resource of the first security level of the one of the credentials, wherein the request is rejected when the security level of the credential fails to match the first security level of one of the credentials stored in the data structure;

provide the user with access to the computing resource based on the computing resource of the on-premises device matching the computing resource of the first security level of the one of the credentials, wherein the request is rejected when the computing resource of the on-premises device fails to match the computing resource of the first security level of the one of the credentials;

determine, based on the security level of the credential matching a second security level, whether an operating system of the on-premises device, requested by the request, matches an operating system of the second security level of the one of the credentials, wherein the user is prevented from accessing additional functionalities of the on-premises device when the security level of the credential fails to match the second security level of the one of the credentials; and provide the user with access to the operating system when the operating system matches the operating system of the second security level of the one of the credentials.

16. The non-transitory computer-readable medium of claim 15, wherein the one or more instructions further cause the device to:
- prevent the user from accessing additional functionalities of the on-premises device when the operating system fails to match the operating system of the second security level of the one of the credentials;
- prevent the user from accessing additional functionalities of the on-premises device when the security level of the credential fails to match a third security level of the one of the credentials;
- determine, when the security level of the credential matches the third security level, whether a virtual machine (VM) instance of the on-premises device, requested by the request, matches a VM instance of the third security level of the one of the credentials;
- provide the user with access to the VM instance when the VM instance matches the VM instance of the third security level of the one of the credentials; and
- prevent the user from accessing additional functionalities of the on-premises device when the VM instance fails to match the VM instance of the third security level of the one of the credentials.

17. The non-transitory computer-readable medium of claim 16, wherein the one or more instructions further cause the device to:
- prevent the user from accessing additional functionalities of the on-premises device when the security level of the credential fails to match a fourth security level of the one of the credentials;
- determine, when the security level of the credential matches the fourth security level, whether an application of the on-premises device, requested by the request, matches an application of the fourth security level of the one of the credentials;
- provide the user with access to the application when the application matches the application of the fourth security level of the one of the credentials; and
- prevent the user from accessing additional functionalities of the on-premises device when the application fails to match the application of the fourth security level of the one of the credentials.

18. The non-transitory computer-readable medium of claim 15, wherein the one or more instructions, that cause the device to provide the user with access to the computing resource when the computing resource of the on-premises device matches the computing resource of the first security level of the one of the credentials, cause the device to:
- establish a virtual private network between the device and the on-premises device via a cloud computing environment; and
- provide the user with access to the computing resource via the virtual private network.

19. The non-transitory computer-readable medium of claim 15, wherein the device communicates with the on-premises device via a cloud computing environment.

20. The non-transitory computer-readable medium of claim 15, wherein the credential includes one or more keys associated with one or more of the security levels.

* * * * *